(12) United States Patent
Igaki et al.

(10) Patent No.: US 7,079,340 B2
(45) Date of Patent: Jul. 18, 2006

(54) APPARATUS AND METHOD OF MEASURING WRITE MAGNETIC FIELD OF RECORDING HEAD

(75) Inventors: Seigo Igaki, Kawasaki (JP); Takahisa Ueno, Kawasaki (JP); Tohru Horie, Higashine (JP); Iwao Okamoto, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/989,610

(22) Filed: Nov. 17, 2004

(65) Prior Publication Data

US 2005/0243454 A1 Nov. 3, 2005

(30) Foreign Application Priority Data

Apr. 30, 2004 (JP) .............................. 2004-136459

(51) Int. Cl.
*G11B 5/09* (2006.01)
(52) U.S. Cl. .............................. 360/39; 360/31; 360/66
(58) Field of Classification Search ..................... None
See application file for complete search history.

(56) References Cited

U.S. PATENT DOCUMENTS

| | | | |
|---|---|---|---|
| 5,365,391 A * | 11/1994 | Sugiyama et al. | 360/110 |
| 5,523,639 A * | 6/1996 | Okamoto et al. | 310/309 |
| 5,812,337 A * | 9/1998 | Tanaka et al. | 360/73.12 |
| 6,023,145 A * | 2/2000 | Karaaslan et al. | 318/652 |
| 6,163,425 A * | 12/2000 | Isokawa et al. | 360/66 |
| 6,696,831 B1 * | 2/2004 | Nozu | 324/210 |
| 6,700,720 B1 * | 3/2004 | Allenspach et al. | 360/46 |
| 6,747,823 B1 * | 6/2004 | Saito et al. | 360/17 |
| 6,775,099 B1 * | 8/2004 | Kuroda et al. | 360/126 |
| 2003/0043486 A1 * | 3/2003 | Nakamura et al. | 360/17 |
| 2004/0233565 A1 * | 11/2004 | Arai et al. | 360/66 |

FOREIGN PATENT DOCUMENTS

JP    A-2003-248910    9/2003

OTHER PUBLICATIONS

"Nanoscale visualization of the magnetic-head field distribution—Contributing to the development of 100Bbit/in² class magnetic disc device," Hitachi, Ltd. News Release, Jun. 24, 2002, http://www.hitachi.co.jp/New/cnews/2002/0624a/0624a.pdf (with English translation), 8 pages.

* cited by examiner

*Primary Examiner*—Wayne Young
*Assistant Examiner*—Dismery Mercedes
(74) *Attorney, Agent, or Firm*—Armstrong, Kratz, Quintos, Hanson & Brooks, LLP

(57) ABSTRACT

After a measurement apparatus records a magnetization state of a reference pattern on at least one specific track of a recording medium, it generates a leakage magnetic field of a demagnetization pattern and demagnetizes the magnetization state of the reference pattern using the leakage magnetic field. Then, the measurement apparatus calculates a difference between the read output of a reference pattern before demagnetization and the read output of a reference pattern after demagnetization on the specific track and obtains a leakage magnetic field of a recording head from the obtained difference.

14 Claims, 14 Drawing Sheets

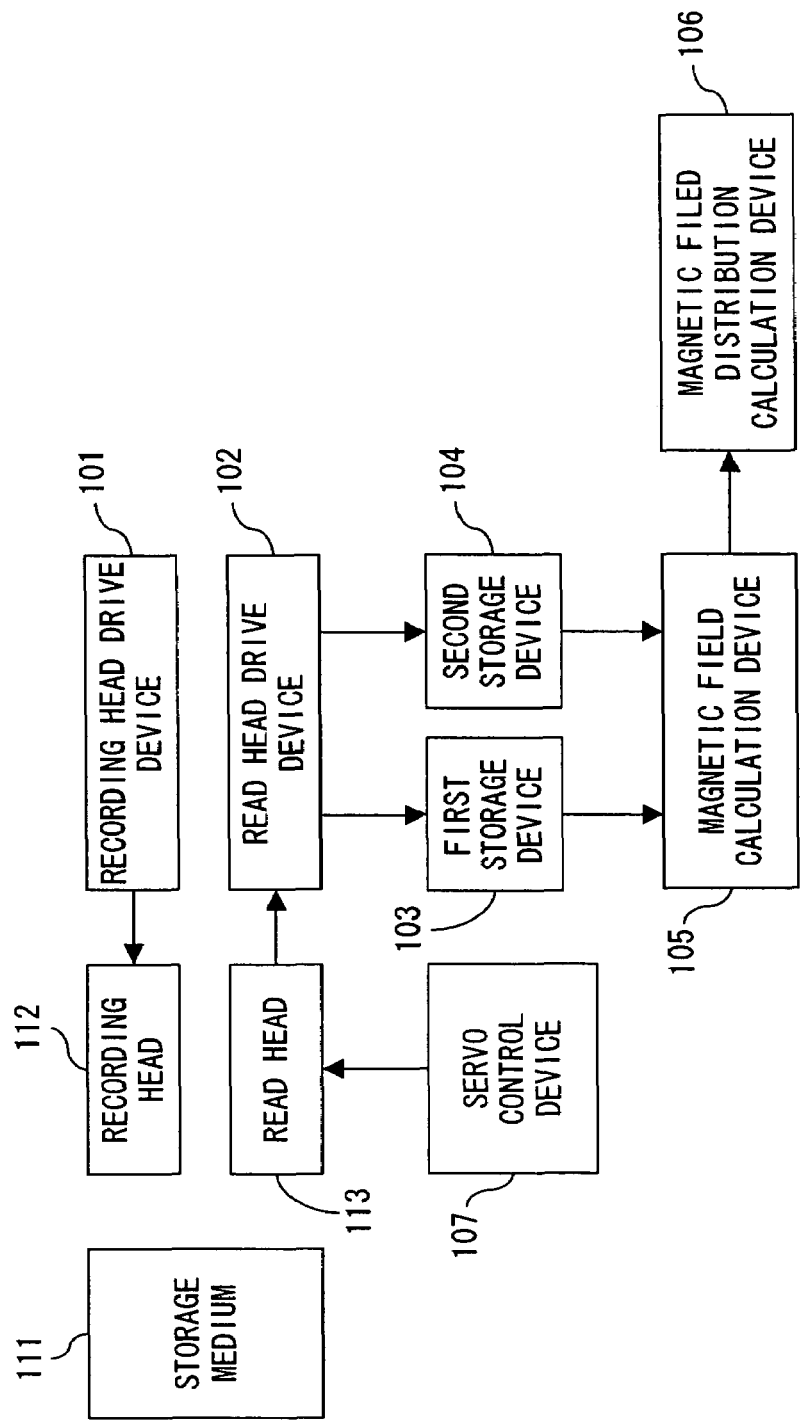
F I G. 1

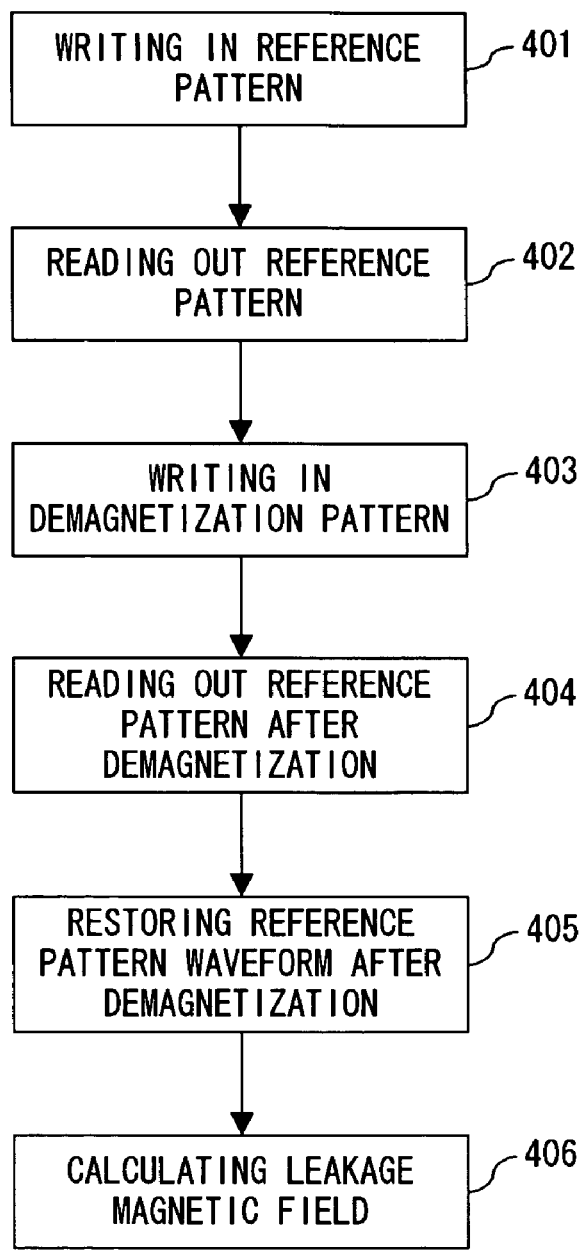
F I G. 4

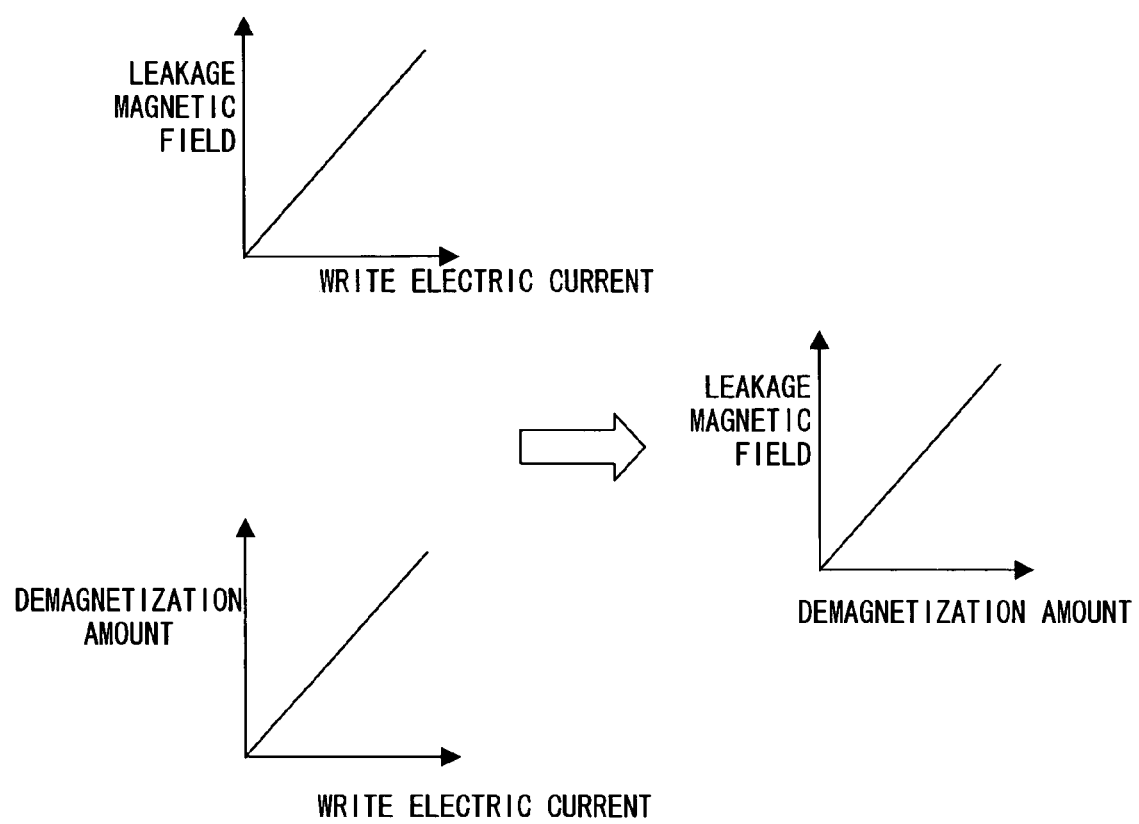
F I G. 6

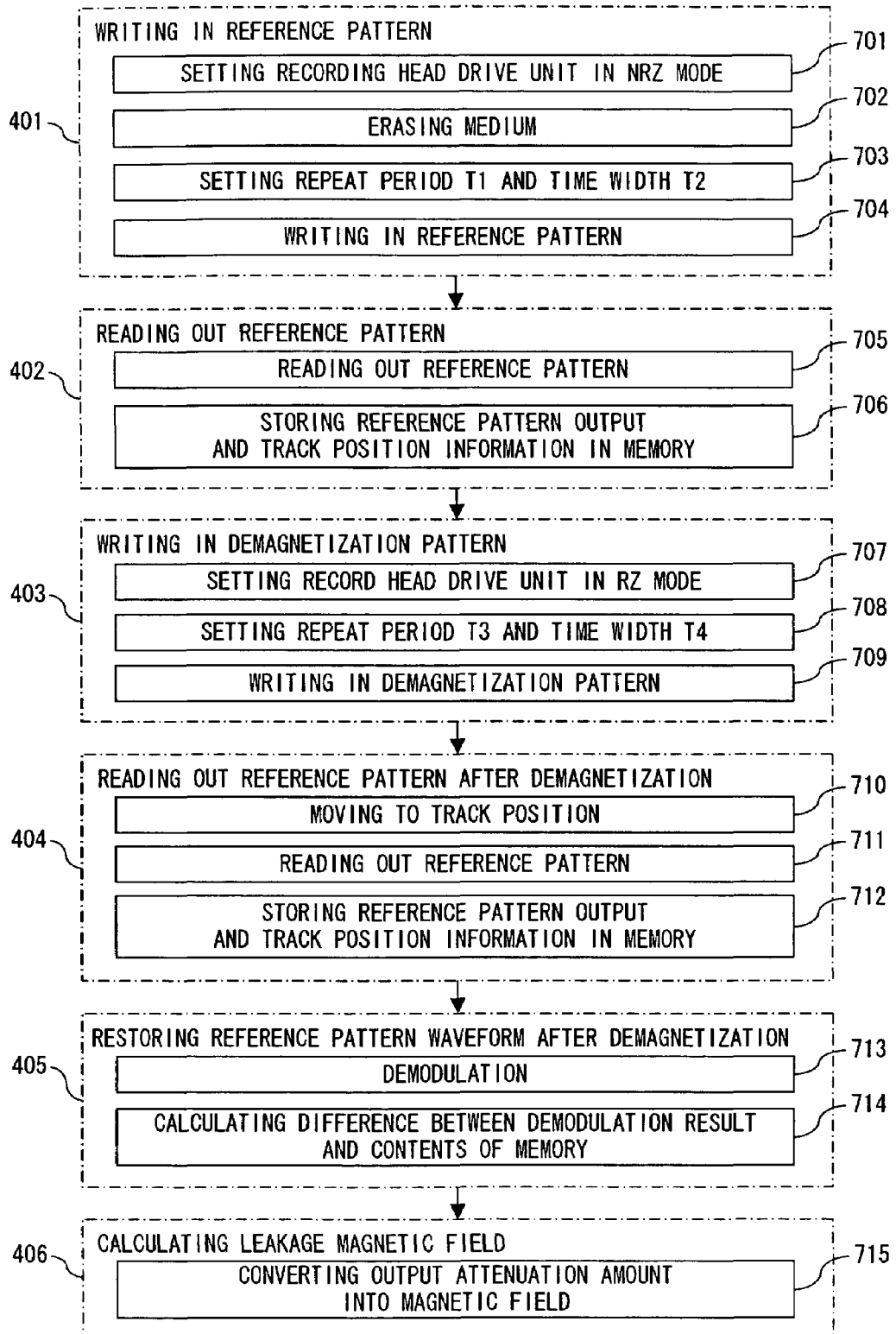
F I G. 7

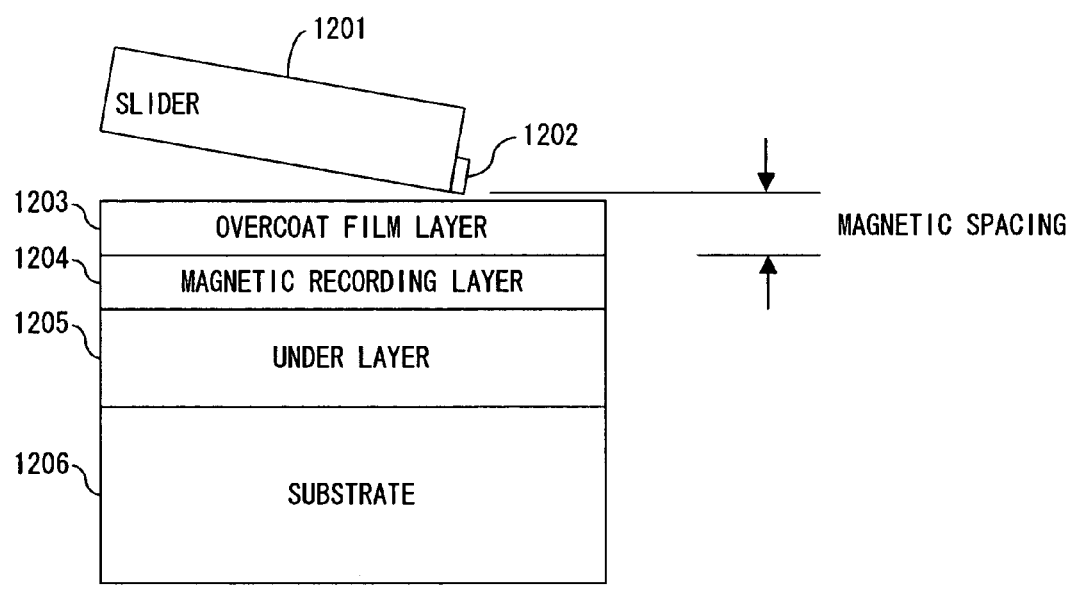
F I G. 1 2

APPARATUS AND METHOD OF MEASURING WRITE MAGNETIC FIELD OF RECORDING HEAD

BACKGROUND OF THE INVENTION

1. Field of the Invention

The present invention relates to the development and production of a storage apparatus for adopting a magnetic recording method such as a magnetic disc apparatus and more specifically it relates to an apparatus and a method of measuring the write magnetic field of a recording head.

2. Description of the Related Art

It is an object to develop a recording head with a narrow core width to form an effective flux transition in a predetermined track width of a magnetic recording medium with the increase of a recording density in a magnetic disc apparatus.

The purpose of a recording head is to output a line of magnetic force generated by the electric current flowing a coil from the write gap between an upper magnetic pole and a lower magnetic pole to a free space, and to form a flux transition on a magnetic recording medium using the magnetic interaction between the line of magnetic force and a magnetic layer on the magnetic recording medium opposing the write gap. Therefore, it is ideal that the line of magnetic force is outputted only from the write gap.

However, since magnetic permeability is not infinite in an actual magnetic pole material, the leakage of a line of magnetic force from the magnetic pole unit other than the write gap is inevitable. Especially, a trailing edge unit (upper magnetic pole) passing on the medium later than the write gap has a size seventh to tenth the size of the write gap. Therefore, there arises a problem such that data of adjacent tracks is erased by a leakage magnetic field (that is, trailing magnetic field) in the case where a recording head is used at a skew angle to the central line of a track.

In order to develop a recording head for a high density recording, the development of a method of measuring the magnetic filed distribution in the vicinity of a recording head simply and non-destructively is required. As for this method, conventionally, a head magnetic field is estimated by the simulation using electromagnetic field analysis software but recently the following method is being established.

(1) Visualization technology of a head magnetic filed using a transmission electron microscope and an image processing (refer to, for example, non-patent literature 1)
(2) Space distribution visualization technology of a head magnetic filed using a horography electron microscope (refer to, for example, patent literature 1)

In addition, a spin-stand with a servo function for positioning a recording head with high precision (for example, a patent literature 2).

[Non-patent literature 1]

"Visualization of recording magnetic field of a magnetic head using a nanometer scale" [online], news release of Hitachi, Ltd. [retrieved on Apr. 12, 2004], via the Internet <URL: http://www.hitachi.co.jp.New/cnews/2002/0624a/0624a.pdf>

[Patent literature 1] Japanese patent application publication No. 2003-248910

[Patent literature 2] Specification of U.S. Pat. No. 6,023,145

In the conventional measurement method using an electron microscope, there is a problem such that expensive equipment is required and destructive inspection is performed in all the methods. In the case of destructive inspection, the electromagnetic conversion characteristic cannot be estimated while a magnetic head used for measurement is mounted on an actual magnetic disc apparatus and the measured magnetic field distribution is hardly corresponded with the electromagnetic conversion characteristic and so on.

SUMMARY OF THE INVENTION

An object of the present invention is to offer an apparatus and a method of measuring a leakage magnetic field of a recording head simply and nondestructively without using expensive measurement equipment.

The measurement apparatus of the present invention comprises a recording head drive device, a read head drive device, a first storage device, a second storage device and a magnetic field calculation device and measures the leakage magnetic field of a recording head.

After the recording head drive device drives the recording head using a write current and records a magnetization state of a reference pattern on at least one specific track of a recording medium, it generates a leakage magnetic field of a demagnetization pattern by driving the recording head using a demagnetization electric current and demagnetizes a magnetization state of the reference pattern using the leakage magnetic field.

The first storage device stores the read output of the reference pattern before demagnetization together with track position information. The second storage device stores the read output of the reference pattern after demagnetization together with track position information. The magnetic field calculation device calculates a difference between the read output of the reference pattern before demagnetization and the read output of the reference pattern after demagnetization and obtains a leakage magnetic field of the recording head from the obtained difference.

BRIEF DESCRIPTION OF THE DRAWINGS

FIG. 1 is a block diagram showing the principle of a measurement apparatus of the present invention;

FIG. 4 is a flowchart of a measurement processing;

FIG. 6 shows a relationship between a demagnetization amount and a leakage magnetic field;

FIG. 7 is a detailed flowchart of a measurement processing;

FIG. 12 shows a structure of a recording medium;

DESCRIPTION OF THE PREFERRED EMBODIMENTS

Figure 2:
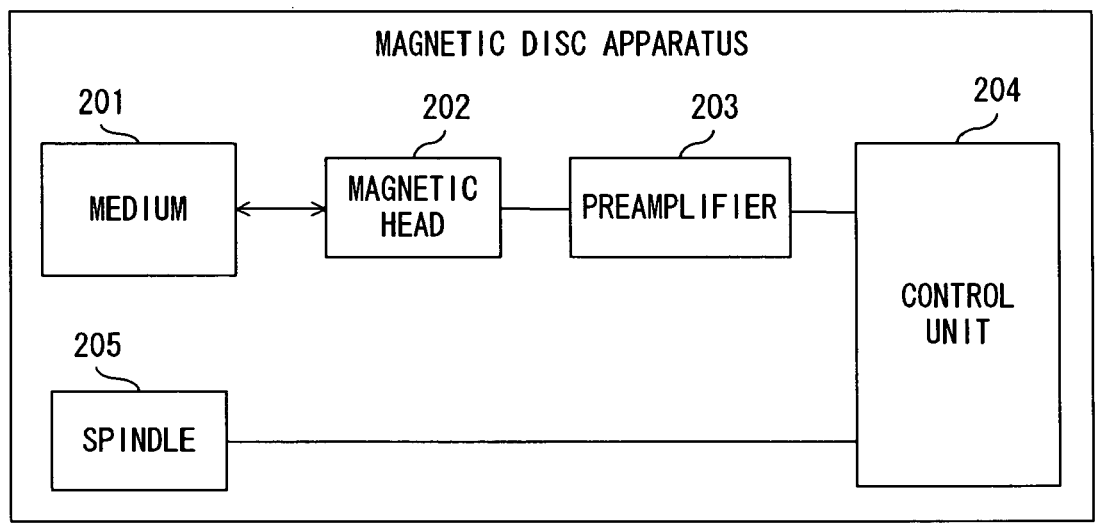
FIG. 2 is a block diagram showing a magnetic disc apparatus.

The following is the detailed explanation of the preferred embodiments of the present invention referring to the drawings.

FIG. 1 shows the principle of a measurement apparatus of the present invention. At the first aspect of the present invention, the measurement apparatus comprises a recording head drive device 101, a read head drive device 102, a first storage device 103, a second storage device 104 and a magnetic field calculation device 105. This apparatus measures a leakage magnetic field of a recording head 112.

After the recording head drive device 101 drives the recording head 112 using a write current and records the magnetization state of a reference pattern on at least one specific track of a recording medium 111, the device drives the recording head 112 using a demagnetization electric current and generates the leakage magnetic field of a demagnetization pattern, thereby demagnetizing the magnetization state of the reference pattern using the generated leakage magnetic field. The read head drive device 102 drives a read head 113 and generates read outputs of the reference pattern before and after demagnetization from at least one specific track.

The first storage device 103 stores the read output of the reference pattern before demagnetization together with traffic position information while the second storage device 104 stores the read output of the reference pattern after demagnetization together with traffic position information. The magnetic field calculation device 105 calculates the difference between the read output of the reference pattern before demagnetization and the read output of the reference pattern after demagnetization and obtains a leakage magnetic field of the recording head 112 from the obtained difference.

If one-dimensional reference patterns are recorded in a travel direction of the recording medium 111 on a specific track by the recording head drive device 101, the read head drive device 102 sequentially reads out the reference patterns and generates time-series read outputs. The magnetic field calculation device 105 calculates the difference between a read output of the reference pattern before demagnetization and a read output of the reference pattern after demagnetization for each time and obtains the attenuation amount of the read output according to a leakage magnetic field of a demagnetization pattern. If the time-series attenuation amounts are sequentially arranged, a one-dimensional distribution of the leakage magnetic field in a travel direction of the recording medium 111 can be generated.

At the second aspect of the present invention, a measurement apparatus of the first aspect further comprises a magnetic field distribution calculation device 106. The recording head drive device 101 records the magnetization state of a reference pattern on at least one specific track of the disc-shaped recording medium 111.

The read head drive device 102 generates the read output of the reference pattern before demagnetization in a rotation direction of the recording medium 111 at a reference position where the read head 113 is adjusted onto the specific track and at each of a plurality of offset positions where the read head 113 is offtracked in a radius direction of the recording medium 111. Then, the device stores each of the obtained read outputs together with each track position information in the first storage device 103. In addition, the read head drive device 102 generates a read output of the reference pattern after demagnetization in a rotation direction at the reference position and at each of the plurality of offset positions and stores each of the obtained read outputs together with each track position information in the second storage device 104.

The magnetic field calculation device 105 calculates a difference between the read output of the reference pattern before demagnetization and the read output of the reference pattern after demagnetization at the reference position and at each of the plurality of offset positions and calculates the magnetic field intensity of the leakage magnetic field from the obtained difference. The magnetic field distribution calculation device 106 calculates a two-dimensional distribution of the leakage magnetic field on the recording medium 111 using a change of the magnetic field intensity in a rotation direction at the reference position and at each of the plurality of offset positions.

In the disc-shaped recording medium 111, not only on a specific track but also at positions where the read head 113 is offtracked in a radius direction, the two-dimensional distribution of the leakage magnetic field can be generated by reading out the reference pattern in the rotation direction and in the radius direction of the recording medium 111.

In the third aspect of the present invention, the measurement apparatus in the second aspect further comprises a servo control device 107 for finely adjusting a position of the read head 113 at the reference position and at each of the plurality of offset positions.

The servo control device 107 enables the highly accurate positioning of the read head 113.

The recording head drive device 101 corresponds to, for example, a recording system preamplifier 303, a switch 305 and a recording head drive unit 306 shown in FIG. 3 that are described later. The read head drive device 102 corresponds to, for example, a read system preamplifier 304 and a read head drive unit 309 shown in FIG. 3. The first storage device 103 and the second storage device 104 correspond to memories 314 and 315 shown in FIG. 3, respectively. The magnetic field calculation device 105 corresponds to, for example, a demodulation unit 316, an output attenuation amount calculation unit 317 and a conversion unit 318 shown in FIG. 3. The magnetic field distribution calculation device 106 corresponds to, for example, a central processing unit (CPU) 320 and a memory 323. The servo control device 107 corresponds to, for example, a magnetic head micromotion unit 307 and a servo control unit 308.

According to the present invention, the one-dimensional distribution, two-dimensional distribution or three-dimensional distribution of the leakage magnetic field of a recording head can be measured simply or non-destructively by simply modifying the equipment that is generally used for the development of a head and a medium.

Generally, the intensity of a leakage magnetic field is less than the central magnetic field of a write gap and it is approximately ⅓ to ¼ of the intensity of the central magnetic field. Therefore, if the write electric current applied to a demagnetization pattern is set approximately identical in amount to the general write electric current in a magnetic disc apparatus, a reference pattern is not completely demagnetized. That is, according to a measurement method of the present invention, the leakage magnetic field of a recording head can be estimated when the head is normally used in a magnetic disc apparatus.

A recording head a leakage magnetic field of which has been measured based on the present invention can be used for the estimation of an electromagnetic conversion characteristic as it is. Therefore, it is possible to perform estimation that cannot be realized by a conventional measurement method, such as a direct correlation analysis between a leakage magnetic field distribution improvement effect and an electromagnetic conversion characteristic.

The preferred embodiments of the present invention discloses a method of measuring the leakage magnetic field of a recording head simply or non-destructively by adding a simple assist device to the equipment that is generally used for the development of a head and a medium.

The preferred embodiments of the present invention include a fundamental principle for measuring the leakage magnetic field of a recording head on an arbitrary track and obtaining a one-dimensional distribution of the leakage magnetic field, a method of obtaining a two-dimensional distribution (in-plane distribution) and a three-dimensional distribution (space distribution) using the fundamental principle, a method using a highly accurate positioning device and a specific record method and a read method of a reference pattern and a demagnetization pattern.

According to a measurement method of the fundamental principle, the magnetization state that is recorded on a magnetic recording medium (reference pattern) in advance is demagnetized by a leakage magnetic flux and a leakage magnetic field is measured by a difference between a read output of the reference pattern before demagnetization and a read output of the reference pattern after demagnetization. The magnetization state (magnetization displacement) on a recording medium can be represented by a line of magnetic force from the N pole to the S pole.

At the time of demagnetization, a return-to-zero (RZ) recording method is used and a magnetization state is demagnetized in a single direction. A waveform of the demagnetized reference pattern is detected by demodulating a beat generated on the reference pattern output demagnetized by slightly shifting the repeat cycle of the reference pattern from that of the demagnetization pattern.

In this measurement method, the non-destructive measurement of the in-plane distribution of the leakage magnetic field can be performed by calculating differences not only at the time of ontrack but also at the time of offtrack. Furthermore, measurement values for a plurality of media each having a different over coat thickness are combined so that the space distribution of the leakage magnetic field can be measured.

FIG. 2 is a block diagram showing a general magnetic disc apparatus. The magnetic disc apparatus shown in FIG. 2 comprises a disc-shaped recording medium 201, a magnetic head 202, a preamplifier 203, a control unit 204 and a spindle 205. The control unit 204 performs a read/write processing of data for the medium 201 by controlling the magnetic head 202 via the preamplifier 203 and rotates the medium 201 by controlling the spindle 205.

Figure 3:
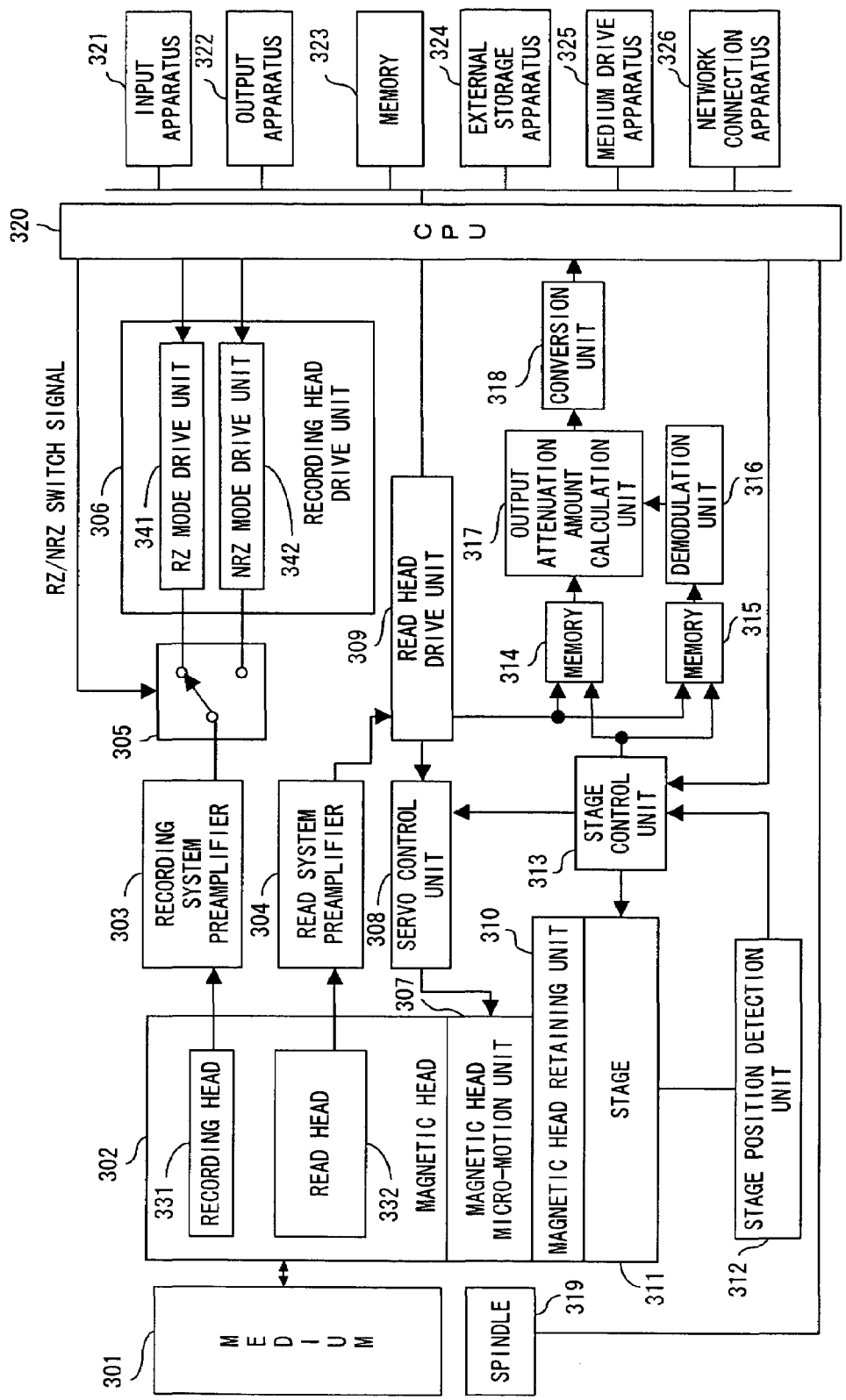
FIG. 3 is a block diagram showing the principle of a leakage magnetic field measurement apparatus.

FIG. 3 is a block diagram showing a leakage magnetic field measurement apparatus of the preferred embodiment. The leakage magnetic field measurement apparatus shown in FIG. 3 comprises a disc-shaped recording medium 301, the recording system preamplifier 303, the read system preamplifier 304, the switch 305, the recording head drive unit 306, the magnetic head micro-motion unit 307, the servo control unit 308, the read head drive unit 309, a magnetic head retaining unit 310, a stage 311, a stage position detection unit 312, a stage control unit 313, the memories 314, 315 and 323, the demodulation unit 316, the output attenuation amount calculation unit 317, the conversion unit 318, a spindle 319, the CPU 320, an input apparatus 321, an output apparatus 322, an external storage apparatus 324, a medium drive unit 325 and a network connection apparatus 326 and it measures the leakage magnetic field of a recording head 331.

The magnetic head 302 corresponds to the magnetic head 202 shown in FIG. 2 and comprises a recording head 331 and a read head 332. The spindle 319 rotates the medium 301 according to a control signal from the CPU 320.

The recording head drive unit 306 comprises an RZ mode drive unit 341 and an NRZ mode drive unit 342. The RZ mode drive unit 341 and the NRZ mode drive unit 342 respectively generate write electric currents of an RZ signal and a non-return-to-zero (NRZ) signal. The switch 305 selects an output of the RZ mode drive unit 341 or an output of the NRZ mode drive unit 342 according to an RZ/NRZ switch signal from the CPU 320 and outputs the selected output to the recording system preamplifier 303. The recording system preamplifier 303 supplies the output of the switch 305 to the recording head 331.

The record mode of the switch 305 can be switched between an RZ mode and an NRZ mode by selecting an output of the RZ mode drive unit. 341 or an output of the NRZ mode drive unit 342 using the switch 305.

The read system preamplifier 304 outputs an output voltage of the read head 332 to the read head drive unit 309. The read head drive unit 309 controls the servo control unit 308 according to a control signal from the CPU 320 and stores an output voltage of the read head 332 in the memories 314 and 315.

The magnetic head 302 is fixed to the magnetic head retaining unit 310 on the stage 311 via the magnetic head micro-motion unit 307. The stage control unit 313 moves the magnetic head 302 to an arbitrary track on the recording medium 301 by moving the stage 311 according to a control signal from the CPU 320. The stage position detection unit 312 detects position information about the magnetic head micro-motion unit 307 and the stage 311 and outputs the detected information to the stage control unit 313. The stage control unit 313 outputs position information from the stage position detection unit 312 to the servo control unit 308 and at the same time converts the information into track position information, thereby storing the information in the memories 314 and 315.

Each of the memories 314 and 315 is, for example, a random access memory (RAM). In the memory 314, an output waveform of the read head 332 corresponding to a reference pattern is recorded together with track position information. In the memory 315, an output waveform of the read head 332 corresponding to the demagnetized reference pattern is recorded together with track position information. The track position information represents a position in a radius direction of the medium 301.

The servo control unit 308 finely adjusts a position of the magnetic head 302 by controlling the magnetic head micro-motion unit 307 according to a control signal from the read head drive unit 309. By providing such a fine-adjustment mechanism, the CPU 320 reads out a servo mark that is recorded on the medium 301 in advance and feedbacks the position information to the magnetic head micro-motion unit 307, thereby enabling the highly accurate positioning.

The modulation unit 316 restores an output waveform of the read head corresponding to the demagnetized reference pattern from contents of the memory 315. The output attenuation amount calculation unit 317 calculates an output attenuation amount using the difference between an output waveform restored by the demodulation unit 316 and an output waveform of the memory 314. The conversion unit 318 converts the output attenuation amount into a magnetic field based on the correlation between an output attenuation amount and a magnetic field that is obtained in advance and outputs the converted magnetic field to the CPU 320.

The memory 323 includes, for example, a read only memory (ROM) and a RAM, and stores the program and data used for a measurement processing. The CPU 320 executes the program using the memory 323 so that it controls the operations of the leakage magnetic field measurement apparatus, thereby performing a measurement processing.

The input apparatus 321 includes, for example, a keyboard, a pointing device, a touch panel, etc. and they are used for inputting the instructions or information from an operator. The output apparatus 322 includes, for example, a display, a printer, a speaker, etc. and they are used for outputting an inquiry to an operator, processing results, etc.

The external storage apparatus 324 includes, for example, a magnetic disc apparatus, an optical disc apparatus, a magneto-optical disc apparatus, a tape apparatus, etc. The leakage magnetic field measurement apparatus stores a program and data in the external storage apparatus 324 and loads them into the memory 323 to be used if necessary.

The medium drive unit 325 drives a portable recording medium and accesses the record contents. The portable recording medium includes an arbitrary computer-readable recording medium such as a memory card, a flexible disc, an optical disc, a magnetic optical disc, etc. An operator stores a program and data in the portable recording medium, loads them into the memory 323 and uses them if necessary.

The network connection apparatus 326 is connected to an optional communication network such as a local area network (LAN), the Internet, etc. and performs a data conversion accompanied with communications. The leakage magnetic field measurement apparatus receives a program and data from an external apparatus via the network connection apparatus 326, loads them into the memory 323 and uses them if necessary.

Meanwhile, instead of the output attenuation amount calculation unit 317 and the conversion unit 318, the CPU 320 may perform the same processings. In this case, an output attenuation amount calculation processing and a conversion processing are included in a program of the CPU 320.

FIG. 4 is a flowchart of measurement processings of the leakage magnetic field measurement apparatus shown in FIG. 3. The CPU 320 records a reference pattern on at least one specific track of the medium 301 via the recording head drive unit 306 (step 401), reads out the reference pattern from the specific track via the read head drive unit 309 and stores the read-out reference pattern together with track position information in the memory 314 (step 402). At this time, in order to compensate the output fluctuation amount due to the distribution of coercivities of a recording medium, etc., the read-out results of the reference pattern are recorded in the memory 314 before the demagnetization in the next step 403.

Then, a demagnetization pattern having a phase different from that of the reference pattern to generate a magnetic field in a direction for demagnetizing the reference pattern is recorded on the reference pattern on the specific track recorded in step 401 (step 403).

The reason why the demagnetization pattern is overwritten on the reference pattern with a different phase from that of the reference pattern is to record the magnetic field distribution of the leakage magnetic field as the demagnetization of the reference pattern on the medium by demagnetizing the respective peaks of the reference pattern using the leakage magnetic field at a different timing of the demagnetization pattern. Since a phase of the reference pattern is different from that of a demagnetization pattern, the demagnetization state that is left on the reference pattern on the medium does not directly correspond to the leakage magnetic field but the state reflects the difference between phases.

Then, the demagnetized reference pattern is read out from the track identical to the track read out in step 402 and the read-out pattern is recorded in the memory 315 together with track position information (step 404).

The demagnetization state left on the reference pattern on the medium 301 shows the difference between the phase of the reference pattern and that of the demagnetization pattern. Therefore, in order to restore the shape of the original leakage magnetic field using the difference, the demodulation unit 316 extracts and modulates the contents of the memory 315 and the output attenuation amount calculation unit 317 calculates the difference between the modulation results and the contents of the memory 314 (step 405).

Then, the conversion unit 318 calculates magnetic field distribution of the leakage magnetic field of a recording head (step 406).

The following is the detailed explanation of a reference pattern and a demagnetization pattern. As a reference pattern, a pattern that is repeated with a period t1 and has a flux transition portion with a time width t2 is used. As a demagnetization pattern, a pattern that is repeated with a period t3 and has a flux transition portion with a time width t4 is used.

The periods t1 and t3 are longer than the time during which the magnetic pole unit including a lower magnetic pole, a write gap and an upper magnetic pole passes one point on a track and the time widths t2 and t4 are approximately identical to or shorter than the time during which a write gap passes one point on a track. An equation $t3=t1+\Delta t$ is set in such a way that the period t3 is slightly different from the period t1.

Figure 5:
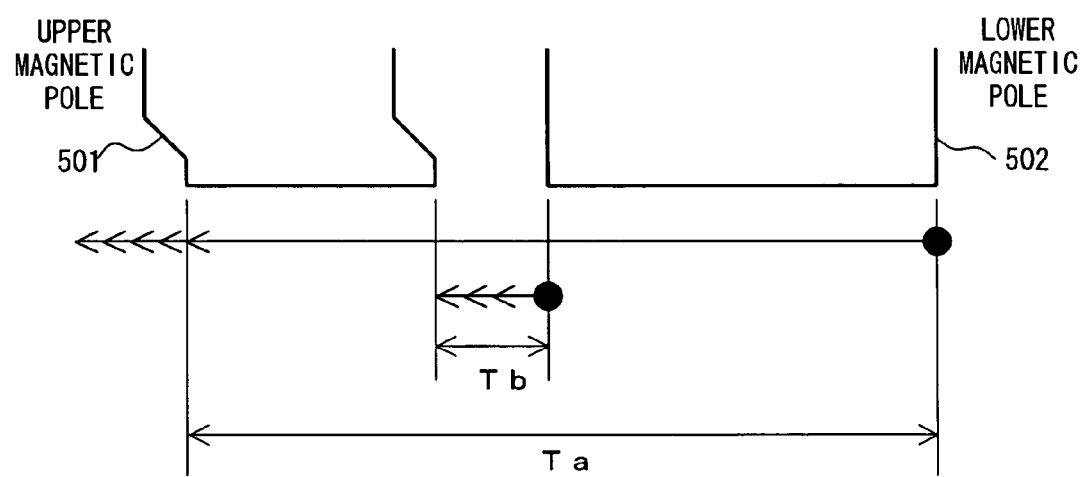
FIG. 5 is a diagram showing a magnetic pole unit of a recording head.

FIG. 5 shows the relation between the shape and the passing time of each part of the magnetic pole unit in the case of a horizontal recording head. A part between the upper magnetic pole 501 and the lower magnetic pole 502 corresponds to a write gap and arrows indicate a rotation direction of the medium 301. Ta indicates a time during which the whole magnetic pole unit passes one point on a track while Tb indicates a time during which the write gap passes one point on a track. In this case, t1 and t3 are longer than Ta while t2 and t4 are equal to or shorter than Tb.

For a reference pattern and a demagnetization pattern, a pattern of either the NRZ or the RZ record method can be used. In addition, a pattern of combining the two methods can be used. The important matter in the relation between a reference pattern and a demagnetization pattern is to control an occurrence magnetic field of the demagnetization pattern so as to demagnetize the target part on the reference pattern (flux transition part corresponding to time width t2) at parts other than t4 of the demagnetization pattern. Specifically, at a part of t4 of the demagnetization pattern, it is necessary to flow an electric current for generating a magnetic field in a direction for magnetizing the target part of the reference pattern.

As the RZ mode drive unit 341 and the NRZ mode drive unit 342 of the recording head drive unit 306, an arbitrary drive unit for realizing different two or more magnetization states can be used. Meanwhile, only either one of the RZ mode drive unit 341 and the NRZ mode drive unit 342 can be used as the recording head drive unit 306. The demodulation unit 316 can appropriately be configured using a combination of publicly known modulation methods corresponding to the difference between the phase of the reference pattern and that of the demagnetization pattern.

As shown in FIG. 6, a leakage magnetic field of the recording head 331 is proportional to a write electric current. As a demagnetization amount generated by the demagnetization pattern is also proportional to the write electric current, the leakage magnetic field and the demagnetization amount are proportional to each other. Therefore, if the correlation between the magnetic field of the recording head 331 and the demagnetization amount is obtained, the leakage magnetic field of the recording head 331 can be calculated from the demagnetization amount of the reference pattern using the relation.

Since a gap magnetic field of the write gap can be measured by a well-known method, the correlation between the demagnetization amount of the reference pattern and the gap magnetic field is obtained by exciting the recording head 331 in a direction for demagnetizing the reference pattern and by measuring the gap magnetic field in advance. Then, the correlation is set in the conversion unit 318. In step 406 shown in FIG. 4, the conversion unit 318 calculates the leakage magnetic field of the recording head 331 from the demagnetization amount of the reference pattern according to the set correlation.

Then, the measurement processing shown in FIG. 4 is explained in detail referring to FIGS. 7 to 10.

FIG. 7 is a flowchart of the detail of the measurement processing shown in FIG. 4. The CPU 320 first switches the switch 305 using an RZ/NRZ switch signal and selects an output of the NRZ mode drive unit 342, thereby setting the recording head drive unit 306 in an NRZ mode (step 701). Prior to the writing of the reference pattern, a specific track of the medium 301 and its peripheral tracks are completely erased (step 702).

Figure 8:
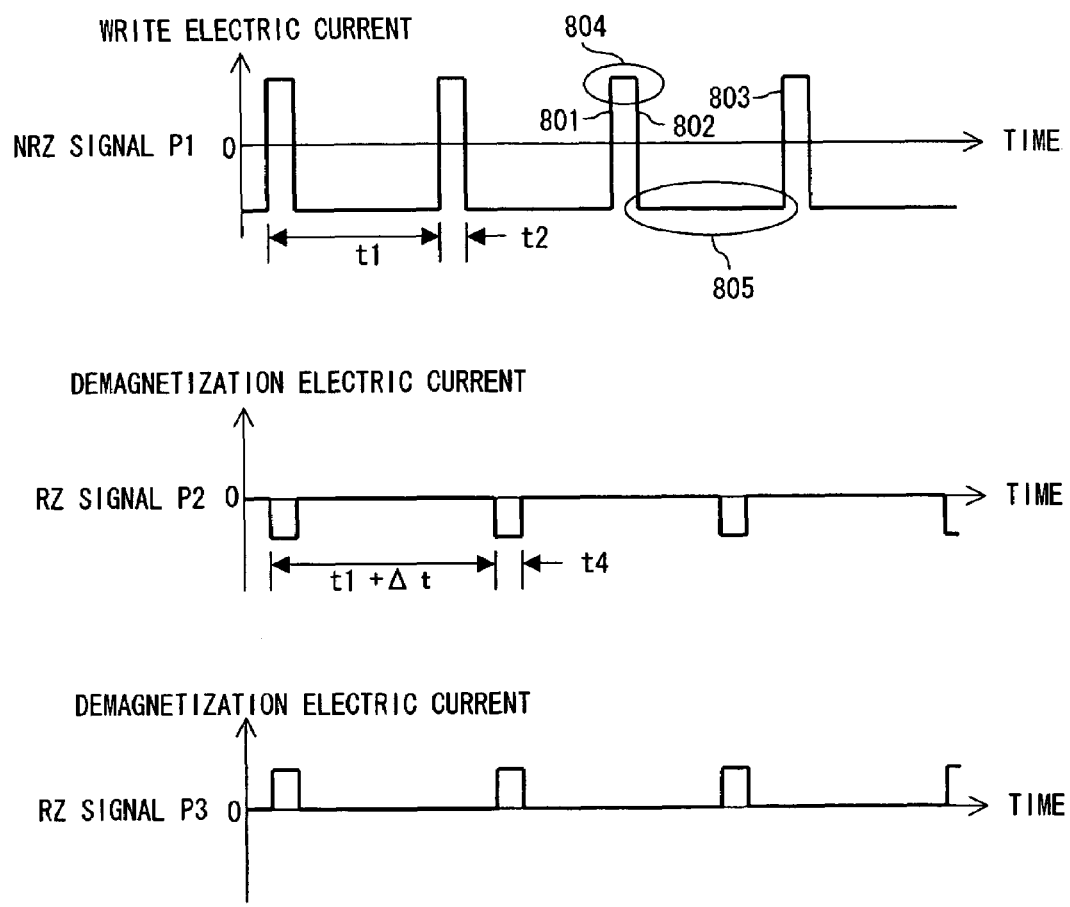
FIG. 8 shows a reference pattern and a demagnetization pattern.

Here, an NRZ signal P1 of the di-bit pattern having a period t1 and a time width t2 is used as a write electric current (recording electric current) of the reference pattern as shown in FIG. 8. For example, each of a rising edge 801 and a falling edge 802 of the NRZ signal P1 represents logic "1" and a pair of continuous "1" at the time width t2 corresponds to a di-bit. Since an electric current value is not changed from a falling edge 802 to the next rising edge 803, logic "0" is represented.

Figure 9:
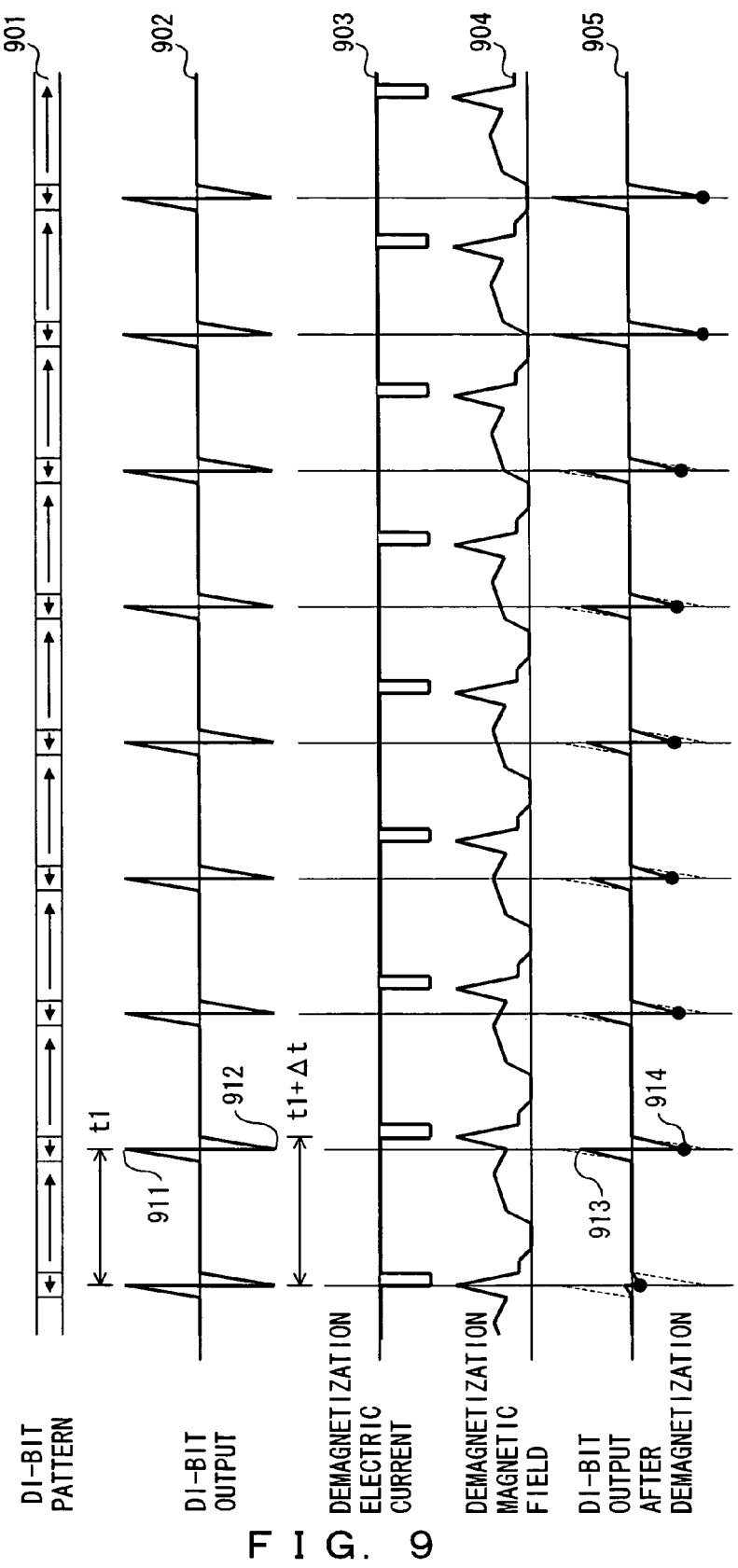
FIG. 9 shows a change of a di-bit output.

The CPU 320 sets the period t1 and the time width t2 in the NRZ mode drive unit 342 (step 703) and records the reference pattern on the specific track of the medium 301 via the NRZ mode drive unit 342 (step 704). As shown in FIG. 9, a magnetization state like a di-bit pattern 901 is recorded on the medium 301 as the reference pattern.

Then, the CPU 320 reads out the reference pattern from the specific track via the read head drive unit 309 (step 705). The read head drive unit 309 records a waveform of the read-out reference pattern (output voltage of the read system preamplifier 304) together with the track position information outputted from the stage control unit 313 in the memory 314 (step 706).

In FIG. 9, a waveform of the reference pattern is shown as a di-bit output 902. A positive peak value 911 and a negative peak value 912 of the di-bit output 902 correspond to a rising edge and a falling edge of the write current shown in FIG. 8, respectively and these peak values are repeated with period t1.

In the case where the waveform of a reference pattern is recorded regarding a plurality of tracks, a movement pitch of the magnetic head 302 among tracks is matched with a movement pitch at step 710.

Then, the CPU 320 switches the switch 305 using an RZ/NRZ switch signal and selects the RZ mode drive unit 341, thereby setting the recording head drive unit 306 in an RZ mode and setting the electric current value of the RZ mode drive unit 341 equal to or less than the electric current value used in step 704 (step 707). Then, the CPU 320 sets the period t3 and the time width t4 in the RZ mode drive unit 341 (step 708) and records a demagnetization pattern on the reference pattern recorded on the specific track via the RZ mode drive unit 341 (step 709).

As a write electric current of the demagnetization pattern, the RZ signal of a di-bit pattern having a period t1+Δt and a time width Δt is used as shown in FIG. 8. In this case, in order to demagnetize the di-bit recorded at timing 804 of the NRZ signal P1, an RZ signal P2 of the di-bit pattern must be used to flow an electric current in a negative direction. In the case where the RZ signal P3 of the di-bit pattern for flowing an electric current in an opposite direction (positive direction) is used, the di-bit of a reference pattern cannot be demagnetized and furthermore there arises a disadvantage such that the magnetization state recorded at timing 805 is demagnetized.

In the case where the RZ signal P2 is used as a demagnetization electric current 903 as shown in FIG. 9, a demagnetization magnetic field 904 is generated by the recording head 331. This demagnetization magnetic field 904 corresponds to a demagnetization pattern.

Then, the CPU 320 refers to track position information recorded in the memory 314 and moves the magnetic head 302 to the track position of the specific track where the reference pattern is read out at step 705 via the read head drive unit 309 and the stage control unit 313 (step 710). Then, the read head drive unit 309 reads out the demagnetized reference pattern from the track position (step 711) and records a waveform of the read-out reference pattern together with the track position information outputted from the stage control unit 313 in the memory 315 (step 712).

In FIG. 9, a waveform of the reference pattern is shown as a di-bit output after demagnetization 905. The di-bit pattern after demagnetization 905 reflects a difference between a phase of the reference pattern corresponding to the di-bit output 902 and that of the demagnetization pattern corresponding to the demagnetization magnetic field 904.

Then, in order to restore a shape of the original leakage magnetic field using the phase difference, the modulation unit 316 modulates a waveform of the reference pattern recorded in the memory 315 and transfers the modulated waveform together with track position information to the output attenuation amount calculation unit 317 (step 713).

The output attenuation amount calculation unit 317 extracts a waveform of the reference pattern and track position information recorded in the memory 314 and calculates the difference between the extracted waveform and the waveform transferred from the modulation unit 316 (step 714).

Figure 10:
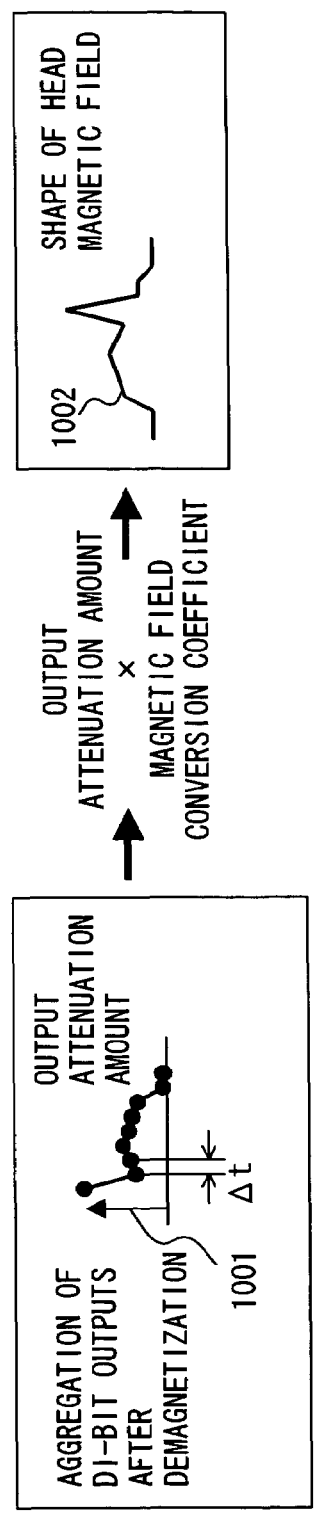
FIG. 10 shows the calculation of a head magnetic field shape.

Specifically, as shown in FIG. 10, the difference between a negative peak value 914 of the di-bit output after demagnetization 905 and the negative peak value 912 of the di-bit output before demagnetization 902 which appear for each period t1 is sequentially calculated and the obtained difference is transferred to the conversion unit 318 as an output attenuation amount 1001. At this time, the order of a plurality of output attenuation amounts is reversed for inverting a time axis and they are transferred as data appearing for each Δt. Since it is assumed that the negative peak value 912 for each period t1 is approximately constant, the difference is normally calculated by substituting a representative value for the negative peak value 912.

The conversion unit 318 converts a plurality of output attenuation amounts transferred from the output attenuation amount calculation unit 317 into a magnetic field intensity in a 1-axis direction (rotation direction of the medium 301) of a leakage magnetic field according to a predetermined correlation and it obtains the shape of magnetic field distribution of the recording head 331 (step 715). In the case where a magnetic field conversion coefficient is set as the correlation, the magnetic field intensity is calculated by multiply the output attenuation amount by the magnetic field conversion coefficient.

An obtained head magnetic field shape 1002 shows one-dimensional distribution of the demagnetization magnetic field 904 and the output apparatus 322 presents this distribution to the operator.

In step 714, instead of calculating a difference between the negative peak value 914 of the di-bit output after demagnetization 905 and the negative peak value 912 of the di-bit output 902, a difference between a positive peak value 913 of the di-bit output after demagnetization 905 and the positive peak value 911 of the di-bit output 902 may be calculated.

The following is the explanation of measurement processing of obtaining an in-plane distribution of a leakage magnetic field. According to this processing, in steps 705 and 706 shown in FIG. 7, the CPU 320 reads out the reference pattern not only at a reference position where the magnetic head 302 is adjusted onto the specific track but also at a plurality of offset positions where the magnetic head 302 is off tracked by predetermined distances in a radius direction of the medium 301 and it stores the read-out reference pattern together with track position information in the memory 314. Furthermore, in steps 710 to 712, the CPU 320 reads out the demagnetized reference pattern at the reference position and each of the offset positions and stores the read-out pattern together with track position information in the memory 315.

Then, in steps 713 to 715, the modulation unit 316, the output attenuation amount calculation unit 317 and the conversion unit 318 calculate not only the magnetic field shape in the rotation direction of the medium 301 at the reference position but also the magnetic field shape in the rotation direction of the medium 301 at the offset positions. Magnetic field shapes are obtained at the plurality of offset positions that are arranged at predetermined intervals in the radius direction on both sides of the reference position on the specific track. Then, the in-plane distribution of the leakage magnetic field can be obtained by combining the thus-obtained magnetic field shapes in the memory 323.

Figure 11:
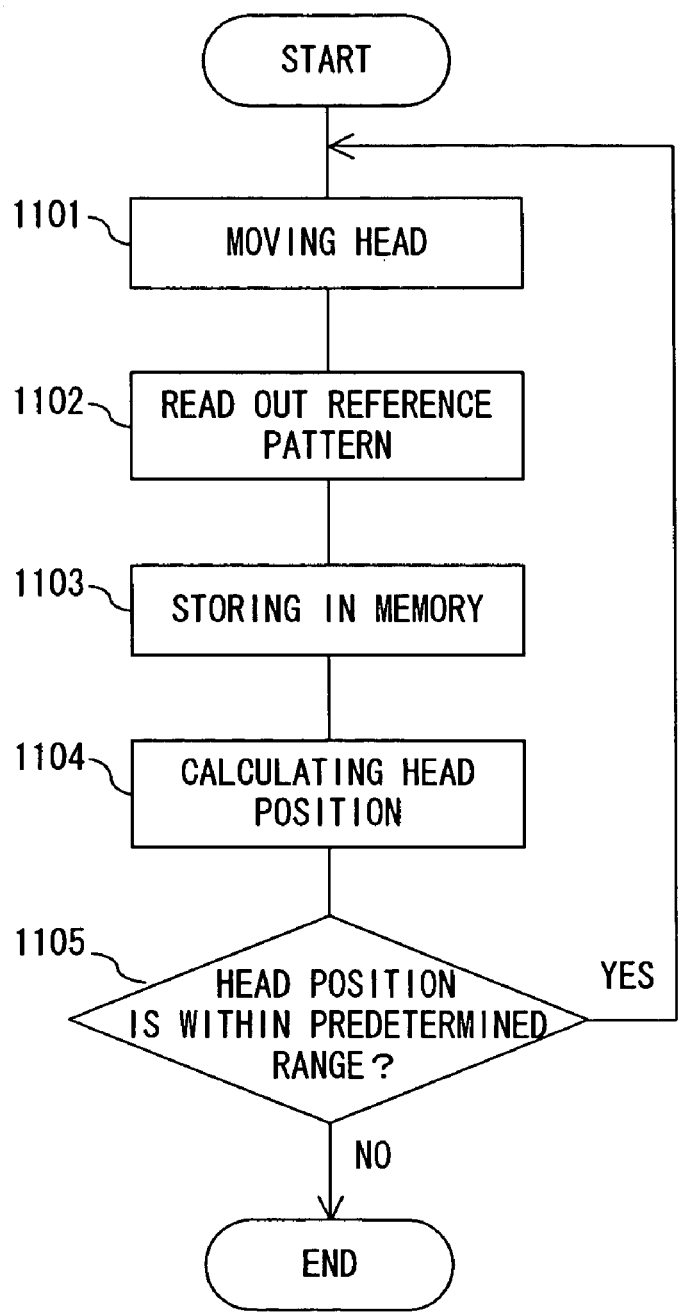
FIG. 11 is a flowchart of an off-track reading processing.

FIG. 11 is a flowchart of the off track reading processing in steps 705 and 706. In this processing, a predetermined reading range is preset in a radius direction on the medium 301.

At first, the CPU 320 moves the magnetic head 302 to a start position via the read head drive unit 309 and the stage control unit 313 (step 1101). At this time, the read head drive unit 309 controls the magnetic head micro-motion unit 307 via the servo control unit 308 and positions the magnetic head 302. As the start position, for example, the end point of the reading range is used. The read head drive unit 309 reads out the reference pattern from the position (step 1102) and stores the read-out reference pattern together with the track position information outputted from the stage control unit 313 in the memory 314 (step 1103).

Then, the CPU 320 adds a predetermined value to the current head position and calculates the next head position (step 1104), thereby checking whether or not the obtained head position falls within the reading range (step 1105). If the head position falls within the reading range, processings in and after step 1101 are repeated while setting the obtained head position as a movement destination. If the head position is outside the reading range, the processing terminates. In steps 710 to 712, an off track reading processing is similarly performed.

In the case where the distribution of the leakage magnetic field in a vertical direction is obtained, a magnetic field distribution is obtained for each of a plurality of storage media having different overcoat thickness and those magnetic field distributions are combined in the memory 323. As shown in FIG. 12, the medium 301 is configured in such a way that an under layer 1205, a magnetic recording layer 1204 and an overcoat layer 1203 are sequentially formed on a substrate 1206 and data is recorded in the magnetic recording layer 1204. At the head of a slider 1201 of the magnetic head 302, a recording and read component 1202 is provided and a space between the component 1202 and the magnetic recording layer 1204 is called a magnetic spacing.

A distance between the component 1202 and the magnetic recording layer 1204 can be varied by using media including the overcoat layers 1203 each having a different thickness. Furthermore, the distribution of the leakage magnetic field in the vertical direction can be obtained by recording the magnetic filed distribution of each medium corresponding to the distance from the magnetic head 302. In addition, the in-plane distribution of the leakage magnetic field is obtained in respect of each of the plurality of storage media each having a different overcoat thickness and the obtained in-plane distributions are combined in the memory 323 so that the space distribution of the leakage magnetic field can be obtained.

In the example shown in FIG. 8, the reference pattern is written using the NRZ signal of a di-bit pattern and the demagnetization pattern is written using the RZ signal of a di-bit pattern. In addition, however, preferred embodiments using the following write electric current are considered.

Figure 13:
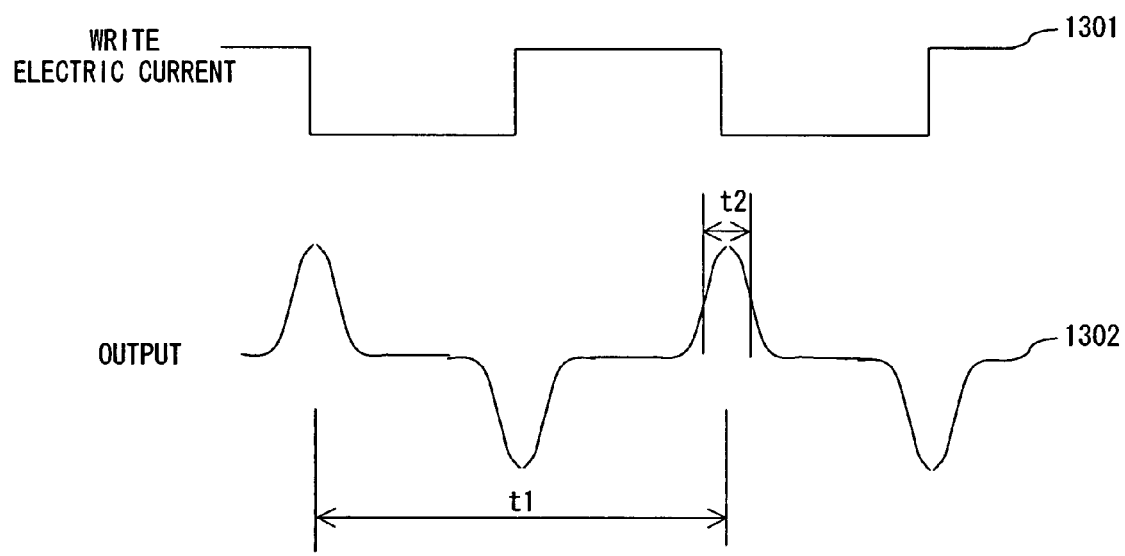
FIG. 13 shows isolated read pulses.

(1) A Reference Pattern Using the NRZ Signal of an Isolated Read Pulse Pattern and a Demagnetization Pattern Using the RZ Signal of an Isolated Read Pulse Pattern In step 401, the CPU 320 sets the recording head drive unit 306 in an NRZ mode and writes in a reference pattern using a write current 1301 (NRZ signal) of an isolated read pulse pattern having a period t1 and a half maximum full-width t2 as shown in FIG. 13.

An isolated read pulse pattern having a period t1 and a half maximum full-width t2 indicates a pattern such that the output voltage is an isolated read pulse 1302 having a period t1 and a half maximum full-width t2 when the magnetization state written in by a write current of that pattern is read out.

In step 403, the CPU 320 sets the recording head drive unit 306 in an RZ mode and writes in a demagnetization pattern using a demagnetization electric current (RZ signal) of the isolated read pulse pattern having a period t3 and a half maximum full-width t4.

(2) A Reference Pattern Using the RZ Signal of a Di-Bit Pattern and a Demagnetization Pattern Using the RZ Signal of a Di-Bit Pattern In step 401, the CPU 320 sets the recording head drive unit 306 in an RZ mode and writes in a reference pattern using a write current (RZ signal) of the di-bit pattern having a period t1 and a time width t2. In step 403, the CPU 320 sets the recording head drive unit 306 in an RZ mode and writes in a demagnetization pattern using a demagnetization electric current (RZ signal) of the di-bit pattern having a period t3 and a time width t4.

(3) A Reference Pattern Using the RZ Signal of an Isolated Read Pulse Pattern and a Demagnetization Pattern Using the RZ Signal of an Isolated Read Pulse Pattern In step 401, the CPU 320 sets the recording head drive unit 306 in an RZ mode and writes in a reference pattern using a write current (RZ signal) of the isolated read pulse pattern having a period t1 and a half maximum full-width t2. In step 403, the CPU 320 sets the recording head drive unit 306 in an RZ mode and writes in a demagnetization pattern using a demagnetization electric current (RZ signal) of the isolated read pulse pattern having a period t3 and a half maximum full-width t4.

In the above-mentioned preferred embodiments, a case where a reference pattern has a constant period slightly different from a constant period a demagnetization pattern has is explained, but the present invention is not limited to this case. For example, a reference pattern having a constant period and a demagnetization pattern that occurs at random time intervals can be combined. Contrarily, a reference pattern that occurs at random time intervals and a demagnetization pattern having a constant period can be combined. As a modulation method of the modulation unit 316 in these cases, a publicly known method such as a sequential sampling method, a random sampling method, etc. that are used in a sampling oscilloscope can be used.

In the above-mentioned preferred embodiments, the longitudinal recording is explained as an example. However, it goes without saying that the present invention can be applied to a case where a recording head and a read circuit are replaced with those for a is perpendicular recording.

Furthermore, the present invention is not limited to the recording head of a magnetic disc apparatus and it can be applied to the all-round magnetic recording head of a storage apparatus including a magnetic optical disc apparatus, a tape apparatus, a video apparatus, etc.

In the development stage of a recording head, a suppressing effect of a leakage magnetic field from regions other than a write gap can be confirmed by measuring and estimating the leakage magnetic field of a recording head using a measurement method of the present invention.

Furthermore, the occurrence of a leakage magnetic field can be suppressed by overlapping a write electric current for negating a leakage magnetic field at the polarity inversion part of a data record signal with a normal write electric current using information about the leakage magnetic field measured using a measurement method of the present invention. In this way, the present invention can be applied to a leakage magnetic field compensation method.

Figure 14:
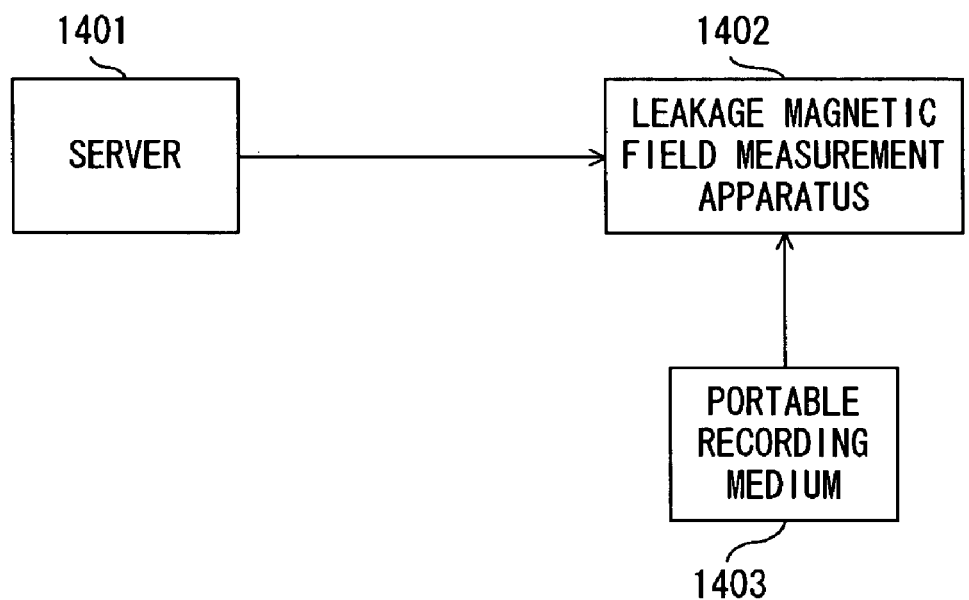
FIG. 14 shows a method of providing a program and data.

FIG. 14 shows a method of offering a program and data to the leakage magnetic field measurement apparatus shown in FIG. 3. The program and data stored in a server 1401 or a portable recording medium 1403 are loaded into the memory 323 of a leakage magnetic field measurement apparatus 1402. The server 1401 generates a propagation signal for propagating a program and data and transmits them to the leakage magnetic field measurement apparatus 1402 via an arbitrary transmission medium on a communication network. The CPU 320 of the leakage magnetic field measurement apparatus 1402 executes the program using the data and performs required processings.

What is claimed is:

1. A measurement apparatus for measuring a leakage magnetic field of a recording head, comprising:
    a recording head drive device for, after driving the recording head using a write electric current and recording a magnetization state of a reference pattern on at least one specific track of a recording medium, generating a leakage magnetic field of a demagnetization pattern by driving the recording head using a demagnetization electric current and for demagnetizing the magnetization state of the reference pattern using the leakage magnetic field;
    a read head drive device for driving a read head and generating a read output of a reference pattern before demagnetization and a read output of a reference pattern after demagnetization from the at least one specific track;
    a first storage device for storing the read output of the reference pattern before demagnetization together with track position information; a second storage device for storing the read output of the reference pattern after demagnetization together with track position information; and
    a magnetic field calculation device for calculating a difference between the read output of the reference pattern before demagnetization and the read output of the reference pattern after demagnetization and for obtaining the leakage magnetic field of the recording head from the obtained difference.

2. The measurement apparatus according to claim 1, wherein the magnetic field calculation device comprising:
    a demodulation unit for demodulating the read output of the reference pattern after demagnetization stored in the second storage device;
    a calculation unit for calculating a difference between the read output of the reference pattern before demagnetization stored in the first storage device and the modulated read output of the reference pattern after demagnetization; and
    a conversion unit for converting the obtained difference into a magnetic field intensity.

3. The measurement apparatus according to claim 1, further comprising a magnetic field distribution calculation device, wherein:
    the recording head drive device records the magnetization state of the reference pattern on at least one specific track of a disc-shaped recording medium;
    the read head drive device generates a read output of the reference pattern before demagnetization in a rotation direction of the recording medium at a reference position where the read head is adjusted onto the at least one specific track and at each of a plurality of offset positions where the read head is off tracked in a radius direction of the recording medium, stores each obtained read output together with each track position information in the first storage device, calculates a read output of the reference pattern after demagnetization in the rotation direction at the reference position and at each of the plurality of offset positions and stores each obtained read output together with each track information in the second storage device;
    the magnetic field calculation device calculates a difference between the read output of the reference pattern before demagnetization and the read output of the reference pattern after demagnetization at the reference position and at each of the plurality of offset positions, and calculates the magnetic filed intensity of the leakage magnetic field from the obtained difference; and
    the magnetic field distribution calculation device generates a two-dimensional distribution of the leakage magnetic field on the recording medium from a change of the magnetic field intensity in the rotation direction at the reference position and at each of the plurality of offset positions.

4. The measurement apparatus according to claim 3, further comprising a servo control device for performing a fine-adjustment of a head position of the read head at the reference position and at each of the plurality of offset positions.

5. The measurement apparatus according to claim 1, wherein:
the recording head drive device outputs as the write current, a non-return-to-zero signal of a di-bit pattern that is repeated with a period t1 longer than a time during which a magnetic pole unit of the recording head passes one point on the recording medium and has a time width t2 approximately equal to or less than a time during which a write gap of the magnetic pole unit passes one point on the recording medium, thereby recording a magnetization state of the di-bit pattern as the reference pattern; and
the recording head drive device outputs as the demagnetization electric current, a return-to-zero signal of a di-bit pattern that is repeated with a period t3 different from the period t1 by $\Delta t$ and has a time width t4 approximately equal to or less than the time during which the write gap passes one point on the recording medium, thereby demagnetizing the magnetization state of the di-bit pattern.

6. The measurement apparatus according to claim 1, wherein:
the recording head drive device outputs as the write current, a non-return-to-zero signal of an isolated read pulse pattern that is repeated with a period t1 longer than a time during which a magnetic pole unit of the recording head passes one point on the recording medium and has a half maximum full-width t2 approximately equal to or less than a time during which a write gap of the magnetic pole unit passes one point on the recording medium, thereby recording a magnetization state of the isolated read pulse pattern as the reference pattern; and
the recording head drive device outputs as the demagnetization electric current, a return-to-zero signal of an isolated read pulse pattern that is repeated with a period t3 different from the period t1 by $\Delta t$ and has a half maximum full-width t4 approximately equal to or less than the time during which the write gap passes one point on the recording medium, thereby demagnetizing the magnetization state of the isolated read pulse pattern.

7. The measurement apparatus according to claim 1, wherein:
the recording head drive device outputs as the write electric current, a return-to-zero signal of a di-bit pattern that is repeated with a period t1 longer than a time during which a magnetic pole unit of the recording head passes one point on the recording medium and has a time width t2 approximately equal to or less than a time during which a write gap of the magnetic pole unit passes one point on the recording medium, thereby recording a magnetization state of the di-bit pattern as the reference pattern; and
the recording head drive device outputs as the demagnetization electric current, a return-to-zero signal of a di-bit pattern that is repeated with a period t3 different from the period t1 by $\Delta t$ and has a time width t4 approximately equal to or less than the time during which the write gap passes one point on the recording medium, thereby demagnetizing the magnetization state of the di-bit pattern.

8. The measurement apparatus according to claim 1, wherein:

the recording head drive device outputs as the write electric current, a return-to-zero signal of an isolated read pulse pattern that is repeated with a period t1 longer than a time during which a magnetic pole unit of the recording head passes one point on the recording medium and has a half maximum full-width t2 approximately equal to or less than a time during which a write gap of the magnetic pole unit passes one point on the recording medium, thereby recording a magnetization state of the isolated read pulse pattern as the reference pattern; and
the recording head drive device outputs as the demagnetization electric current, a return-to-zero signal of an isolated read pulse pattern that is repeated with a period t3 different from the period t1 by $\Delta t$ and has a half maximum full-width t4 approximately equal to or less than the time during which the write gap passes one point on the recording medium, thereby demagnetizing the magnetization state of the isolated read pulse pattern.

9. A measurement method of measuring a leakage magnetic field of a recording head, comprising:
driving the recording head using a write electric current and recording a magnetization state of a reference pattern on at least one specific track of a recording medium;
driving a read head and generating a read output of a reference pattern from the at least one specific track;
storing the generated read output of a reference pattern together with track position information in a first storage device;
driving the recording head using a demagnetization electric current, thereby generating a leakage magnetic field of a demagnetization pattern and demagnetizing the magnetization state of the reference pattern using the leakage magnetic field;
driving the read head and generating a read output of a reference pattern after demagnetization from the at least specific track;
storing the generated read output of the reference pattern together with traffic position information in a second storage device;
calculating a difference between the read output of the reference pattern before demagnetization, which is stored in the first storage device, and the read output of the reference pattern after demagnetization, which is stored in the second storage device; and
obtaining the leakage magnetic field of the recording head from the obtained difference.

10. The measurement method according to claim 9, further comprising
confirming a suppression effect of a leakage magnetic field from a portion other than a write gap of the recording head by estimating the leakage magnetic field of the recording head.

11. A recording head, wherein a leakage magnetic field is estimated using the measurement method according to claim 9.

12. A storage apparatus comprising a recording head, wherein a leakage magnetic field is estimated using the measurement method according to claim 9.

13. A computer-readable medium on which is recorded a program for a processing apparatus which controls a measurement apparatus for measuring a magnetic field of a recording head, the program enabling the processing apparatus to control the measurement apparatus such that the measurement apparatus performs:

driving the recording head using a write electric current and recording a magnetization state of a reference pattern on at least one specific track of a recording medium;

driving a read head and generating a read output of a reference pattern from the at least one specific track;

storing the generated read output of a reference pattern together with track position information in a first storage device;

driving the recording head using a demagnetization electric current, thereby generating a leakage magnetic field of a demagnetization pattern and demagnetizing the magnetization state of the reference pattern using the leakage magnetic field;

driving the read head and generating a read output of a reference pattern after demagnetization from the at least specific track;

storing the generated read output of the reference pattern together with traffic position information in a second storage device;

calculating a difference between the read output of the reference pattern before demagnetization, which is stored in the first storage device, and the read output of the reference pattern after demagnetization, which is stored in the second storage device; and obtaining the leakage magnetic field of the recording head from the obtained difference.

14. A measurement apparatus for measuring a leakage magnetic field of a recording head, comprising:

recording head drive means for, after driving the recording head using a write electric current and recording a magnetization state of a reference pattern on at least one specific track of a recording medium, generating a leakage magnetic field of a demagnetization pattern by driving the recording head using a demagnetization electric current and for demagnetizing the magnetization state of the reference pattern using the leakage magnetic field;

read head drive means for driving a read head and generating a read output of a reference pattern before demagnetization and a read output of a reference pattern after demagnetization from the at least one specific track;

first storage means for storing the read output of the reference pattern before demagnetization together with track position information;

second storage means for storing the read output of the reference pattern after demagnetization together with track position information; and magnetic field calculation means for calculating a difference between the read output of the reference pattern before demagnetization and the read output of the reference pattern after demagnetization and for obtaining the leakage magnetic field of the recording head from the obtained difference.

* * * * *